United States Patent
Strater et al.

(10) Patent No.: US 7,039,432 B2
(45) Date of Patent: May 2, 2006

(54) DYNAMIC UPSTREAM ATTENUATION FOR INGRESS NOISE REDUCTION

(75) Inventors: Jay Strater, Jamison, PA (US); Dean Stoneback, Souderton, PA (US); Kevin T. Chang, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 583 days.

(21) Appl. No.: 10/309,874

(22) Filed: Dec. 4, 2002

(65) Prior Publication Data

US 2003/0114112 A1    Jun. 19, 2003

Related U.S. Application Data

(60) Provisional application No. 60/336,669, filed on Dec. 4, 2001.

(51) Int. Cl.
*H04B 7/01* (2006.01)

(52) U.S. Cl. .................. 455/501; 455/67.13; 455/522; 725/124; 725/125

(58) Field of Classification Search .................. 455/14, 455/523, 15, 24, 67.13, 501, 522, 63.1, 232.1, 455/239.1; 725/125, 124, 111
See application file for complete search history.

(56) References Cited

U.S. PATENT DOCUMENTS

| | | | | |
|---|---|---|---|---|
| 3,750,022 A | * | 7/1973 | Curry et al. | ................ 725/125 |
| 3,924,187 A | * | 12/1975 | Dormans | ..................... 725/125 |
| 5,737,461 A | | 4/1998 | Sanders et al. | |
| 5,742,713 A | * | 4/1998 | Sanders et al. | ............... 385/24 |
| 5,765,097 A | * | 6/1998 | Dail | .......................... 725/125 |
| 5,845,191 A | * | 12/1998 | Morgan | ...................... 725/129 |
| 5,937,330 A | * | 8/1999 | Vince et al. | ................. 725/125 |
| 5,963,844 A | | 10/1999 | Dail | |
| 5,966,410 A | * | 10/1999 | Freyman et al. | ............ 375/296 |
| 6,125,514 A | * | 10/2000 | Yu | .............................. 24/489 |
| 6,166,760 A | * | 12/2000 | Kay | .......................... 725/107 |
| 6,215,514 B1 | | 4/2001 | Harris | |
| 6,880,170 B1 | * | 4/2005 | Kauffman et al. | .......... 725/125 |
| 2002/0106012 A1 | * | 8/2002 | Norrell et al. | ............. 375/222 |

* cited by examiner

*Primary Examiner*—Quochien B. Vuong
*Assistant Examiner*—Minh D. Dao
(74) *Attorney, Agent, or Firm*—Lawrence T. Cullen

(57) ABSTRACT

A dynamic arrangement for reducing the presence of ingress noise in the upstream signal path of a two-way cable system utilizes a variable attenuation element and amplifier disposed along the upstream signal path. The amplifier includes a bypass switch so that the amplifier may be switched in to or out of the upstream path. A signal processor associated with the communications gateway functions to calculate the upstream loss present at the gateway and control the operation of the attenuation element, amplifier and bypass switch accordingly. Upstream attenuation is selected to be as large as possible, yet still allow in-building cable devices to communicate with their associated head end (HE) receiver equipment, after accounting for maximum transmit limitations.

7 Claims, 3 Drawing Sheets

FIG. 1 CG PASS-THROUGH FUNCTIONALITY

DYNAMIC UPSTREAM ATTENUATION FOR INGRESS NOISE REDUCTION

CROSS-REFERENCE TO RELATED APPLICATION

This application claims the benefit of Provisional Application No. 60/336,669 filed Dec. 4, 2001.

TECHNICAL FIELD

The present invention relates to a hybrid fiber cable (HFC) communication system and, more particularly, to an arrangement for reducing the presence of ingress noise in the upstream signal path from a subscriber location to a cable head-end (HE) or hub location.

BACKGROUND OF THE INVENTION

Modern cable systems utilize a hybrid fiber cable (HFC) architecture in which signals are distributed via a fiber optic connection to a node that converts the optical signal to an electrical signal and distributes the signals to residences (subscribers) via a tree and branch coaxial cable distribution network ("plant") consisting of the coaxial cable, amplifiers and taps. The plant can be made bidirectional through the use of a fiber optic return signal from the node to the head end. A return band, typically from 5–42 MHz, is used to support transmission from devices in the residence back to the head end. Transmission from the residences are received at the node, converted to an optical signal, and transmitted to the head-end on a separate return fiber or on a return wavelength separate from the downstream wavelength.

Suppressing undesirable energy in an HFC network, particularly ingress noise in the HFC upstream, is an important characteristic when operating a network having such a bi-directional communication path on a shared wire between a head-end and each of a plurality of remote points. One technical challenge is to maintain adequate network integrity for signals being transmitted in the return path so that the information in these signals is not contaminated and does not either require retransmission (if data traffic), or is defined as "dropped" (if voice traffic). "Ingress" is defined as unwanted energy that enters the network at a weak point, where these weak points are all too often at or near a remote point where there is a shield discontinuity, a poor shield, or a faulty connector. For example, two-way dispatch services, amateur radio transmission, various commercial, medical or industrial electronic equipment, as well as ignition noise from combustion engines, all contribute to ingress noise. Additionally, one very common and troublesome source of ingress noise is electromagnetic emissions at a subscriber's premise from electric motors in fax machines, vacuum cleaners, hair dryers and the like. These emissions are often coupled onto the cable system cable via unterminated cable stubs in the subscriber's premise, the stubs tending to act as antennas. Thus, the upstream "ingress" noise signals will sum at the head end from the multiple weak points in both the plant and the subscriber premises.

It is desirable for a system operation to be able to mitigate upstream ingress noise originating at the subscriber premises, while minimally disturbing service to the subscriber.

SUMMARY OF THE INVENTION

The need remaining in the art is addressed by the present invention, which relates to a hybrid fiber cable (HFC) communication system and, more particularly, to an arrangement for reducing the presence of ingress noise in the upstream signal path from a subscriber location to a cable head-end (HE) or hub location. It is to be noted that "HE" will be referred to throughout the remainder of this discussion, where it is to be presumed that the ability to mitigate the return of ingress noise from a subscriber premises is just as applicable at a hub or other upstream location housing HFC receiver equipment for subscriber transmitters.

In accordance with the present invention, dynamically adjustable upstream attenuation is used to reduce the presence of ingress noise, where the value of the attenuation, as well as the inclusion/exclusion of an upstream amplifier, is controlled by an RF module located within the communications gateway (CG) at the subscriber's premise. Upstream attenuation is selected to be as large as possible, while still allowing in-building cable devices to communicate with their head end (HE) receiver equipment, after accounting for maximum transmit limitations.

Ingress reduction in accordance with the present invention requires a side-of-the-building communications gateway (CG) device in which cable communications (both downstream and upstream) pass through the gateway and the gateway contains an embedded cable modem (CM). The communications gateway makes use of its embedded cable modem's transmit level, along with home and upstream pass-through assumptions, to calculate and apply an upstream attenuation that forces in-building cable devices behind the communications gateway to transmit at high levels yet still close the link margin needed to communication with their head end receivers.

It is an aspect of the present invention that the communications gateway pass-through loss adjustment must be conducted periodically, since the communication gateway's cable modem upstream transmission level will change. Upstream transmit levels for two-way cable devices will change with changes in plant conditions, such as temperature swings and other environmental factors. In addition, any changes in a communications gateway's upstream attenuation should be applied gradually enough to allow for upstream power ranging or "long-loop AGV" operations to adjust to the changes.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
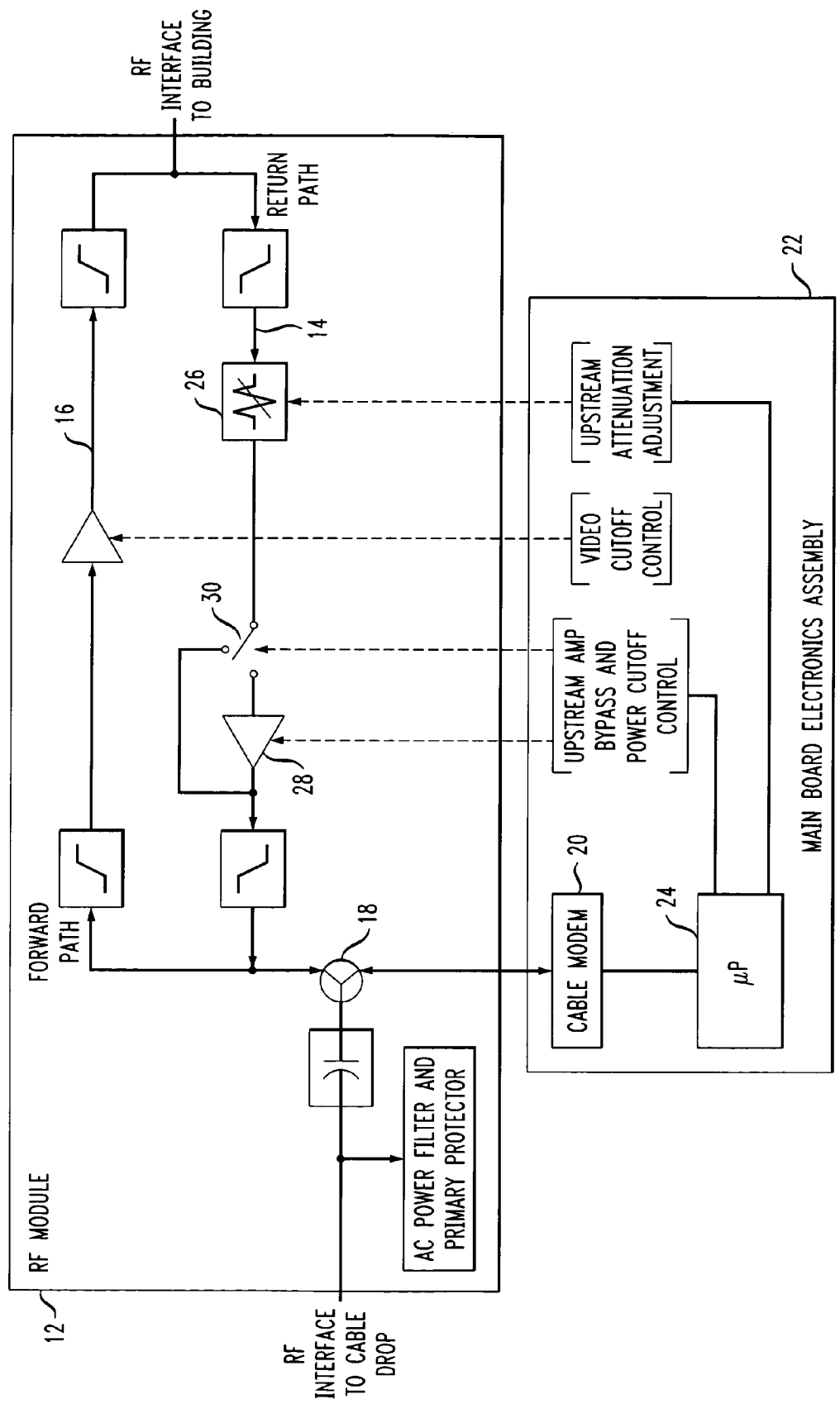
FIG. 1 illustrates, in block diagram form, an exemplary communications gateway (CG) and associated RF module that may be used to perform the upstream ingress noise reduction operation of the present invention.

FIG. 1 illustrates an exemplary communications gateway (CG) 10 that may be used to implement the upstream noise reduction feature of the present invention. In accordance with the present invention, use of the CG pass-through loss adjustment for ingress noise reduction is possible as long as CG 10 includes a two-way RF pass-through path between RF interface module 12 and the building to which it is attached (see FIG. 2). As shown in FIG. 1, RF interface module 12 contains a separate upstream RF pass-through path 14 and a separate downstream RF pass-through path 16. A signal splitter 18 is used to connect both upstream path 14 and downstream path 16 to a cable modem 20. In this particular embodiment, cable modem 20 is located on a separate electronics assembly board 22. As will be discussed in detail below, a processor 24 is also disposed on electronics assembly board 22 and used to control the operation of upstream path 14 and reduce the impact of ingress signal noise.

In accordance with the operation of the present invention, upstream path 14 includes an upstream attenuation adjustment element 26, where th supplied by processor 24. Also included in upstream path 14 is an upstream amplifier 28 (the amplifier gain supplied by processor 24), and a bypass switch 30 controlled by processor 24. In operation, when the calculated upstream loss (calculated using the relationship defined hereinbelow) is found to be greater than zero, processor 24 activates bypass switch 30 to be in the "open" position and removes amplifier 28 from the upstream path, where amplifier 28 is also turned "off" to reduce power consumption. When the calculated upstream loss (as defined below) is less than zero, processor 24 operates to "close" switch 30, and thus couples amplifier 28 into upstream path 14.

Figure 2:
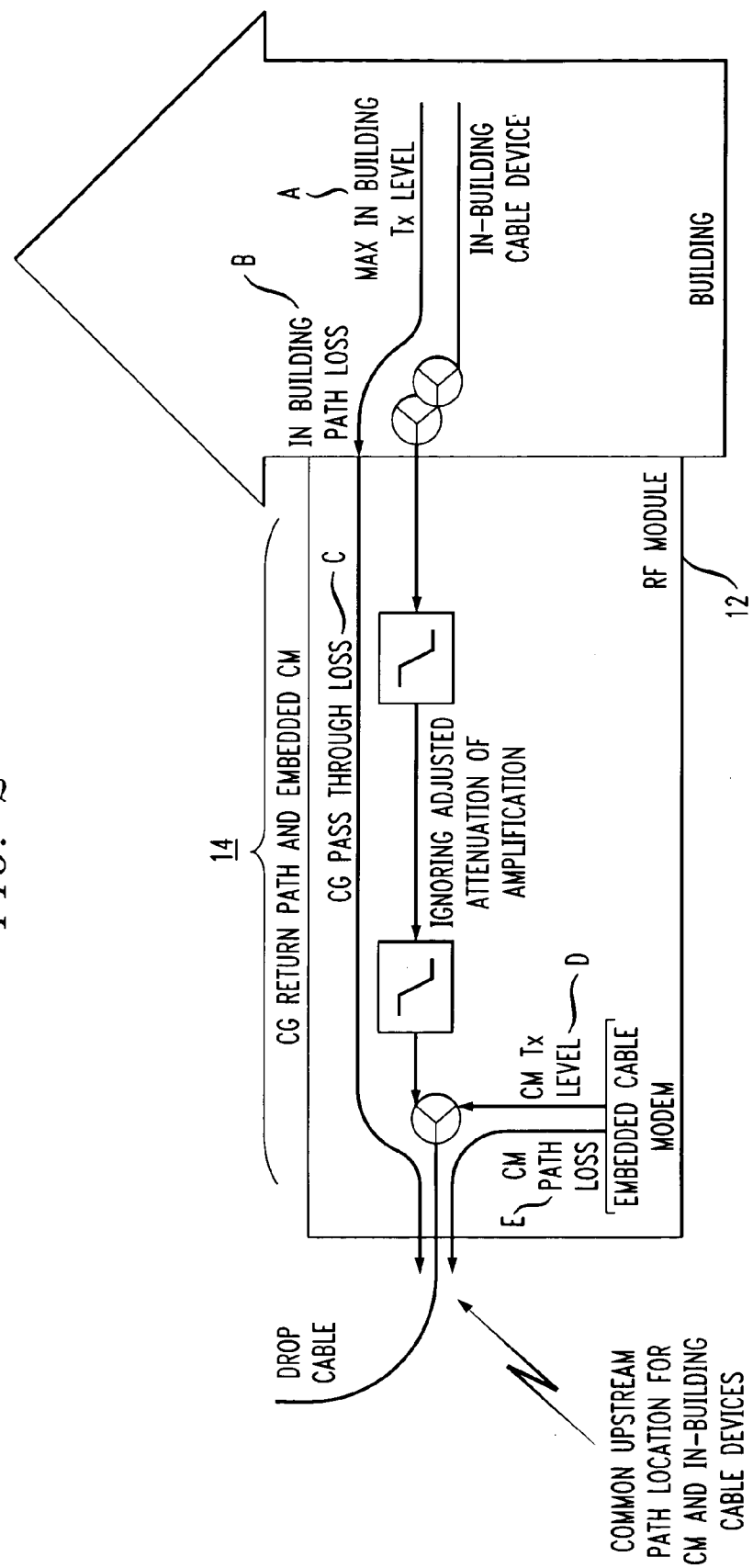
FIG. 2 contains a diagram illustrating the various signal component sources used to calculate upstream loss in accordance with the teachings of the present invention.
Figure 3:
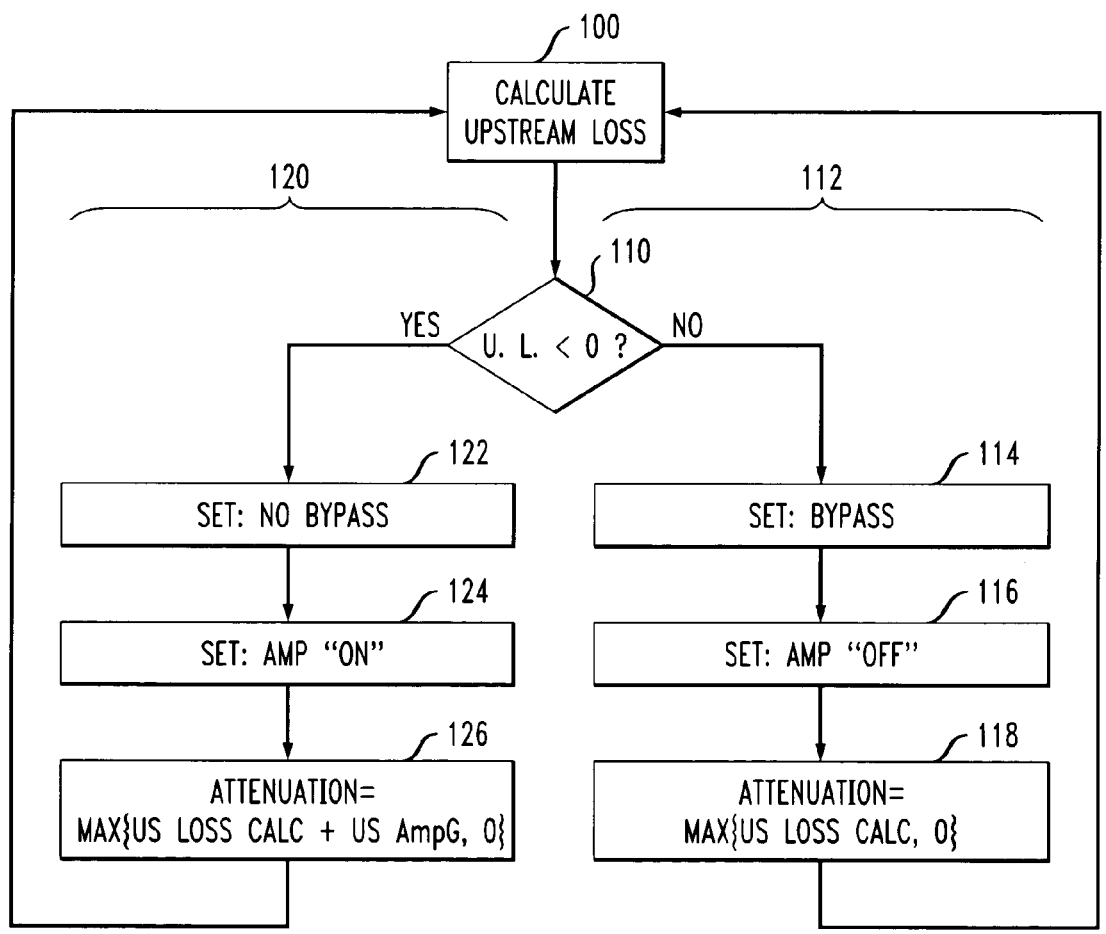
FIG. 3 is a flow chart illustrating the process used to determine the settings within the RF module in response to the calculated upstream loss in accordance with the present invention.

FIG. 2 contains a diagram of an exemplary residence and its associated CG 10, where this diagram is useful in discussing the various parameters that are measured and/or determined for use in calculating upstream loss in the operation of the present invention. FIG. 3 contains a simplified flowchart illustrating the process used by processor 24 in controlling the operation of upstream signal path 14. Referring concurrently to FIGS. 2 and 3, processor 24 is first used to determine the value of the upstream signal loss, where upstream signal loss (USLossCalc) is defined as follows:

$$USLossCalc = (MaxInBuildingTxLevel - InBuilding-PathLoss - CGPassthroughLoss) - (CMTxLevel - CMPathLoss) + MaxChannelBandDelta - CalcErrorMargin$$

The various components within the above upstream-signal loss calculation can be defined as follows and with particular reference to FIG. 2:

MaxInBuildingTxLevel: is illustrated as element A in FIG. 2 and is defined as an estimate of the maximum transmit level for two-way cable devices in a residence (as measured in dBmV)

InBuildingPathLoss: is illustrated as element B in FIG. 2 and is defined as an estimate of the nominal high-end upstream path loss in a residence (as measured in dB)

CGPassthroughLoss: is illustrated as element C in FIG. 2 and is defined as the loss in the CG between the RF building interface and the RF cable-drop interface (as measured in dB), ignoring any adjusted attenuation or amplification CMTxLevel: is illustrated as element D in FIG. 2 as is defined as the CG's monitored cable modem (CM) transmit level (measured in dBmV)

CMPathLoss: is illustrated as element E in FIG. 2 and is defined as the CG's upstream path loss between its embedded CM interface and the RF interface to the drop cable (measured in dB)

MaxChannelBandDelta: is defined by the following:

$$10 \log(CMTxBW/MaxInBuildingTxBW),$$

where CMTxBW is defined as the bandwidth of the upstream channel in the CG's cable modem that is providing the CMTxLevel reference, and MaxInBuilding-TxBW is defined as the maximum bandwidth of the in-building cable device associated with MaxinBuildingTxLevel, as defined above.

CalcErrorMargin: is defined as a predetermined "margin of error" used for adapting the determined value of the upstream loss calculation.

It is presumed that the use of a conventional microprocessor as processor 24 is capable of receiving these various values as inputs and then generating, as an output, a value for "upstream loss". Further, the various values could be stored as SNMP MIB parameters to allow for configuration via a remote management device. Once a value of "upstream loss" has been calculated, the various components within upstream signal path 14 can be adjusted to reduce the presence of ingress noise in the signal propagating along this upstream path 14. Referring to FIG. 3, in fact, the first step in the process of the present invention is to calculate upstream loss (i.e., USLossCalc, step 100). Once the loss is determined, the value is analyzed to determine if it is positive or negative (step 110). If it is determined that the upstream loss value is positive, the process continues down branch 112 of the flowchart of FIG. 3, with processor 24 then transmitting a first control signal to bypass switch 30, instructing switch 30 to be in the "open" position (step 114). Processor 24 also instructs amplifier 28 to be turned "off" (step 116), thus saving power. Lastly, processor 24 instructs attenuation adjustment element 26 to set its attenuation at the greater of "zero" or the calculated upstream loss (step 118). As previously indicated, this adjustment should be gradual to allow for the cable devices in the customer premises to adjust to the change.

Presuming that the calculated value of the upstream loss was negative (branch 120 from decision step 110), processor 24 is used to instruct "closed" position (step 122) thus inserting amplifier 28 in upstream signal path. Processor 24 also activates amplifier 28 to be "on" (step 124), where amplifier 28 is set to exhibit a predetermined, static, amplifying factor (such as, for example, 15 db). Lastly, processor 24 instructs attenuation adjustment element 26 to set its attenuation at the greater of the sum of the calculated upstream loss and the amplifier gain or "zero" (step 126). Again, this adjustment should be gradual to allow for the cable devices in the customer premises to adjust to the change.

The static parameters that make up the upstream loss calculation (that is, all values except for the CMTxLevel), as well as the static value of the gain of amplifier 28 may be preconfigured at the initialization of CG 10, or may be configured thereafter, as the case may be. The more knowledge a cable operator has about a subscriber's in-building cable devices and cable path, the more accurate will be the choices for MaxInBuildingTxLevel, InBuildingPathLoss and MaxInBuildingTxBW. As these values increase in accuracy, the value of CalcErrorMargin is necessarily reduced.

The above-described process determines the upstream loss or gain needed to set the power density of an upstream signaling transmission of the CG's in-building cable devices, operating at near maximum transmit levels, to be near that of the CG's cable mode at the RF cable-drop interface. The algorithm forces a CG's in-building cable devices and embedded cable mode power densities close to the same level at the CG's RF cable-drop interface since this interface represents a location where the upstream path and associated path loss/gain is the same back to the head end. The process of the present invention uses power density rather than power, since the head end receiver levels are set relative to a given noise density. Most importantly, the process sets the upstream loss as high as possible to still enable in-home devices to communicate, thereby reducing the relative ingress noise entering the cable plant beyond the CG upstream attenuator. In addition, the process of the present invention provides flexibility by accommodating an upstream amplifier and determining when the amplifier should be bypassed to limit CG power use.

EXAMPLE

The following example is useful in understanding the application of the ingress noise reduction technique of the present invention. In particular, consider the following configured parameters for USLossCalc:

MaxInBuildingTxLevel=58 dBmV for the maximum DOCSIS 1.1 transmit level for QPSK modulation. This could be associated with an individual cable modem, a video set-top-box, or telephony Media Terminal Adapter (MTA) with embedded CM. Alternatively, the value could be smaller, associated with a narrowband video return path for a set-top-box that does not utilize an embedded CM. The choice of cable device associated with MaxInBuildingTxLevel will influence the choice of InBuildingTxBW, as shown below.

InBuildingPathLoss=8 dB for two cable splitters in the home

CGPassthroughLoss=5 dB for a single splitter and dual duplex filter losses between the CG's RF interface at the building and cable drop CMPathLoss=4 dB for a single splitter between the CG's CM interface and the RF drop-cable interface CMTxBW=1.6 MHz for a typical DOCSIS 1.1 upstream CM bandwidth MaxInBuildigTxBW=3.2 MHz for the maximum DOCSIS 1.1 upstream CM bandwidth MaxChannelBandDelta=10log(1.6 MHz/3.2 MHz)=−3 dB CalcErrorMargin=3 dB margin of error Next, consider a range of CMTxLevel values spanning a maximum of 58 dBmV to a minimum of 8 dBm V. Assuming a gain of 15 dB for amplifier 28 (as shown in FIG. 1), the following table illustrates the USLossCalc results, as well as upstream amplifier state, upstream amplifier bypass state, and upstream attenuation level resulting from the inventive process as described above.

| CMTxLevel | USLossCalc | US Amp State | US Bypass State | US Attenuation |
| --- | --- | --- | --- | --- |
| 58 dBmV | −14 dB | ON | No Bypass | 1 dB |
| 48 dBmV | −4 dB | ON | No Bypass | 11 dB |
| 38 dBmV | 6 dB | OFF | Bypass | 6 dB |
| 28 dBmV | 16 dB | OFF | Bypass | 16 dB |
| 18 dBmV | 26 dB | OFF | Bypass | 26 dB |
| 8 dBmV | 36 dB | OFF | Bypass | 36 dB |

As shown, when the CMTxLevel is high, amplification is required and attenuation can be low. This is attributed to the fact that CG's embedded cable modem is indicating that high upstream transmission levels are needed, perhaps due to high tap loss at the cable drop to the CG. Conversely, the results indicate that when the CMTxLevel is low, amplification is not needed and attenuation can be high. This result is attributed to the CG's cable modem's indication that low upstream transmission levels are needed, perhaps due to low tap loss at the cable drop.

It is to be understood that the periodicity of the CG pass-through loss and upstream amplifier state adjustment should be frequent enough to accommodate return path changes as affected by the HFC plant. In addition, any changes in upstream attenuation and/or gain should be applied gradually enough to allow for upstream power ranging or "long-loop AGC" operations to adjust to the changes.

What is claimed is:

1. An arrangement for reducing the presence of ingress noise from a communications gateway, including an embedded cable modem, at a subscriber location, said communications gateway comprising an RF module containing separate upstream and downstream signal paths, the arrangement comprising a variable attenuation element disposed in the upstream signal path in the RF module;

a signal amplifier, exhibiting predetermined gain, disposed in said upstream signal path in said RF module; and a bypass switch disposed at the input of said signal amplifier, said bypass switch for controlling the presence of said signal amplifier in said upstream signal path such that when said bypass switch is in the "open" position said signal amplifier is removed from said upstream signal path and when said bypass switch is in the "closed" position said signal amplifier is inserted in said upstream signal path; and a signal processor for calculating the value of upstream loss as used in attenuation and amplifier settings, said signal processor for controlling the operation of said variable attenuation element, said signal amplifier and said bypass switch so as to reduce the presence of ingress noise in the upstream signal path;

wherein the signal processor controls the attenuation level of said variable attenuation element such that when the calculated upstream loss is positive the attenuation is set to be essentially equal to said calculated upstream loss.

2. An arrangement as defined in claim 1 wherein the signal processor controls the bypass switch such that the switch is "opened" when the calculated upstream loss is positive and the switch is "closed" when the calculated loss is negative.

3. An arrangement as defined in claim 1 wherein the signal processor controls the amplifier to be "off" when the calculated upstream loss is positive and "on" when the calculated upstream loss is negative.

4. An arrangement as defined in claim 1 wherein the signal processor controls the attenuation level of the variable attenuation element such that when the calculated upstream loss is negative the attenuation is set to be essentially equal to the maximum of the sum of the upstream loss and the predetermined gain of the amplifier, or zero.

5. An arrangement as defined in claim 1 wherein in calculating upstream loss, the signal processor uses the following relationship:

$$USLossCalc=(MaxInBuildingTxLevel-InBuildingPathLoss-CGPassthroughLoss)-(CMTxLevel-CMPathLoss)+MaxChannelBandDelta-CalcErrorMargin,$$

where MaxInBuildingTxLevel is defined as an estimate of the maximum transmit level for two-way cable devices at a subscriber, InBuildingPathLoss is defined as an estimate of the nominal high-end upstream path loss at said subscriber, CGPassthroughLoss is defined as the loss in the communication gateway between the RF subscriber interface and the RF cable-drop interface ignoring any adjusted attenuation or amplification in said path, CMTxLevel is defined as the communication gateway's monitored cable modem transmit level, CMPathLoss is defined as the communication gateway's upstream path loss between its embedded cable modem interface and the RF cable-drop interface, CalcErrorMargin is defined as a predetermined "margin of error" used for adapting the determined value of the upstream loss calculation, and MaxChannelBandDelta is defined as 10 log(CMTxBW/MaxInBuildingTxBW), where CNTxBW is defined as the bandwidth of the upstream channel in the communication gateway's cable modem being used to provide the CMTxLevel reference, and MaxInBuildingTxBW is defined as the maximum bandwidth of said in-building cable device with MaxInBuildingTxLevel as a reference.

6. A method of reducing the presence of ingress noise in the upstream path of a bidirectional cable system at a communications gateway located at a subscriber premises, the method comprising the steps of:
calculating the upstream loss present at the communications gateway;
if the calculated loss is positive, bypassing an amplifier disposed in the upstream path and setting an upstream variable attenuation element to exhibit an attenuation equal to the calculated upstream loss value; and
if the calculated loss is negative, inserting the amplifier along the upstream path, said amplifier exhibiting a predetermined positive gain value and setting an upstream variable attenuation element to exhibit an attenuation equal to the maximum of the sum of the predetermined positive gain value and the calculated upstream loss value, or zero.

7. The method as defined in claim 6 wherein the step of calculating the upstream loss utilizes the following relation:

$$USLossCalc = (MaxInBuildingTxLevel - InBuildingPathLoss - CGPassthroughLoss) - (CMTxLevel - CMPathLoss) + MaxChannelBandDelta - CalcErrorMargin,$$

where MaxInBuildingTxLevel is defined as an estimate of the maximum transmit level for two-way cable devices at a subscriber, InBuildingPathLoss is defined as an estimate of the nominal high-end upstream path loss at said subscriber, CGPassthroughLoss is defined as the loss in the communication gateway between the RF subscriber interface and the RF cable-drop interface ignoring any adjusted attenuation or amplification in said path, CMTxLevel is defined as the communication gateway's monitored cable modem transmit level, CMPathLoss is defined as the communication gateway's upstream path loss between its embedded cable modem interface and the RF cable-drop interface, CalcErrorMargin is defined as a predetermined "margin of error" used for adapting the determined value of the upstream loss calculation, and MaxChannelBandDelta is defined as 10 log(CMTxBW/MaxInBuildingTxBW), where CMTxBW is defined as the bandwidth of the upstream channel in the communication gateway's cable modem being used to provide the CMTxLevel reference, and MaxInBuildingTxBW is defined as the maximum bandwidth of said in-building cable device with MaxBuildingTxLevel as a reference.

* * * * *